R. S. MOORE.

ROTARY CYLINDER GAS ENGINE.

APPLICATION FILED SEPT. 3, 1915.

Reissued Apr. 1, 1919.

14,625.

2 SHEETS—SHEET 1.

Witnesses

Albert Pahlma

Inventor

Robert S. Moore

By

Sturtevant Thomson

Attorneys

THE NORRIS PETERS CO., PHOTO-LITHO., WASHINGTON, D. C.

R. S. MOORE.

ROTARY CYLINDER GAS ENGINE.

APPLICATION FILED SEPT. 3, 1915.

Reissued Apr. 1, 1919.

14,625.

2 SHEETS—SHEET 2.

Inventor

Robert S. Moore

Witnesses

Albert Porkus

By

Sturtevant Munson

Attorneys

THE HORRIS PEERS CO., PHOTO-LITHO., WASHINGTON, D. C.

BEST AVAILABLE COPY

UNITED STATES PATENT OFFICE.

ROBERT S. MOORE, OF WASHINGTON, DISTRICT OF COLUMBIA, ASSIGNOR, BY MESNE ASSIGNMENTS, TO EMILE BERLINER, OF WASHINGTON, DISTRICT OF COLUMBIA.

ROTARY-CYLINDER GAS-ENGINE.

14,625. Specification of Reissued Letters Patent. Reissued Apr. 1, 1919.

Original No. 1,093,349, dated April 14, 1914, Serial No. 799,948, filed November 8, 1913. Application for reissue filed September 3, 1915. Serial No. 48,933.

*To all whom it may concern:*

Be it known that I, ROBERT S. MOORE, a citizen of the United States, residing at Washington, in the District of Columbia, have invented certain new and useful Improvements in Rotary-Cylinder Gas-Engines, of which the following is a description, reference being had to the accompanying drawings and to the figures of reference marked thereon.

The invention relates to new and useful improvements in rotary engines and more particularly to engines of this type wherein there is a plurality of cylinders mounted on a rotating casing.

An object of the invention is to provide a rotary gas engine having an intake port for each cylinder which is normally open during the period of intake and free from valves so as to afford an unobstructed passage for admitting the fuel or combustion gases, with a rotary member which is common to all of the cylinders and which operates to close the intake ports at all times during the rotation of the cylinders except substantially during the period of intake for the respective cylinders.

Figure 1:
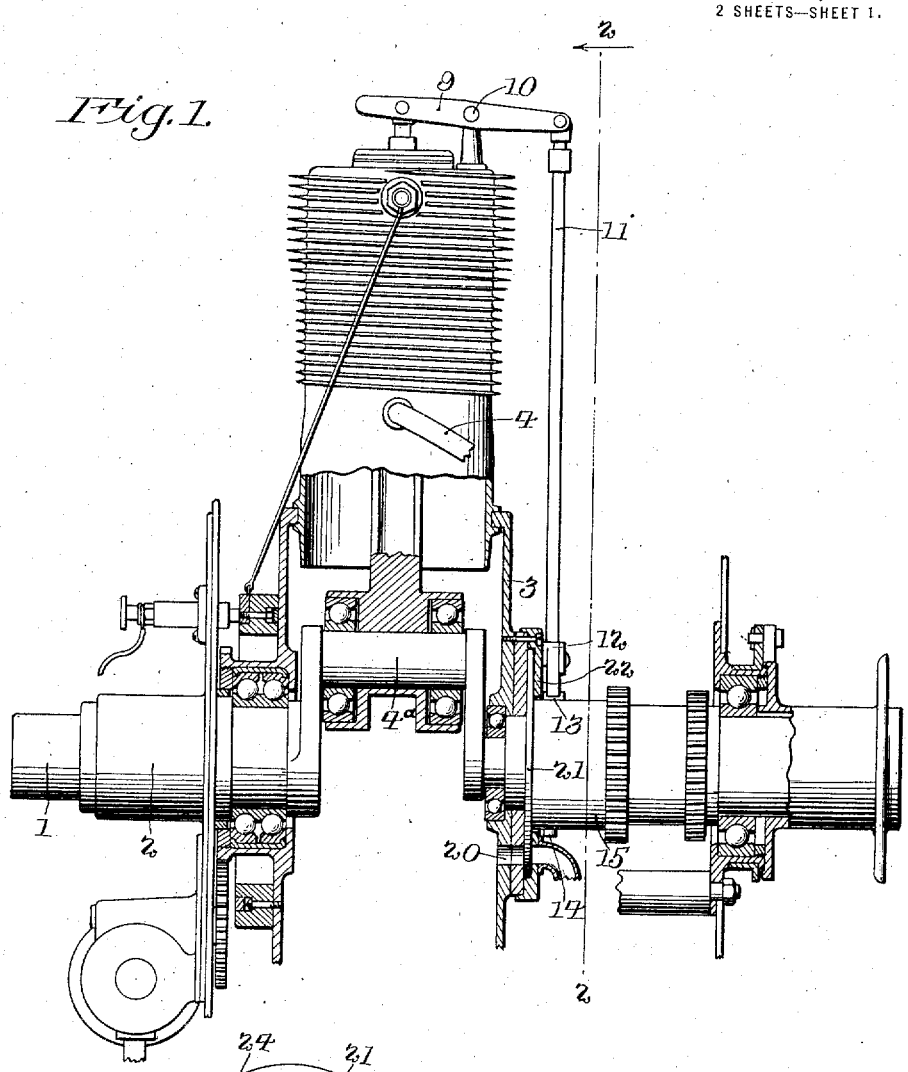
Figure 7:
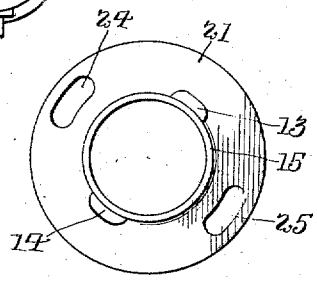
Figures 2, 3, 5:
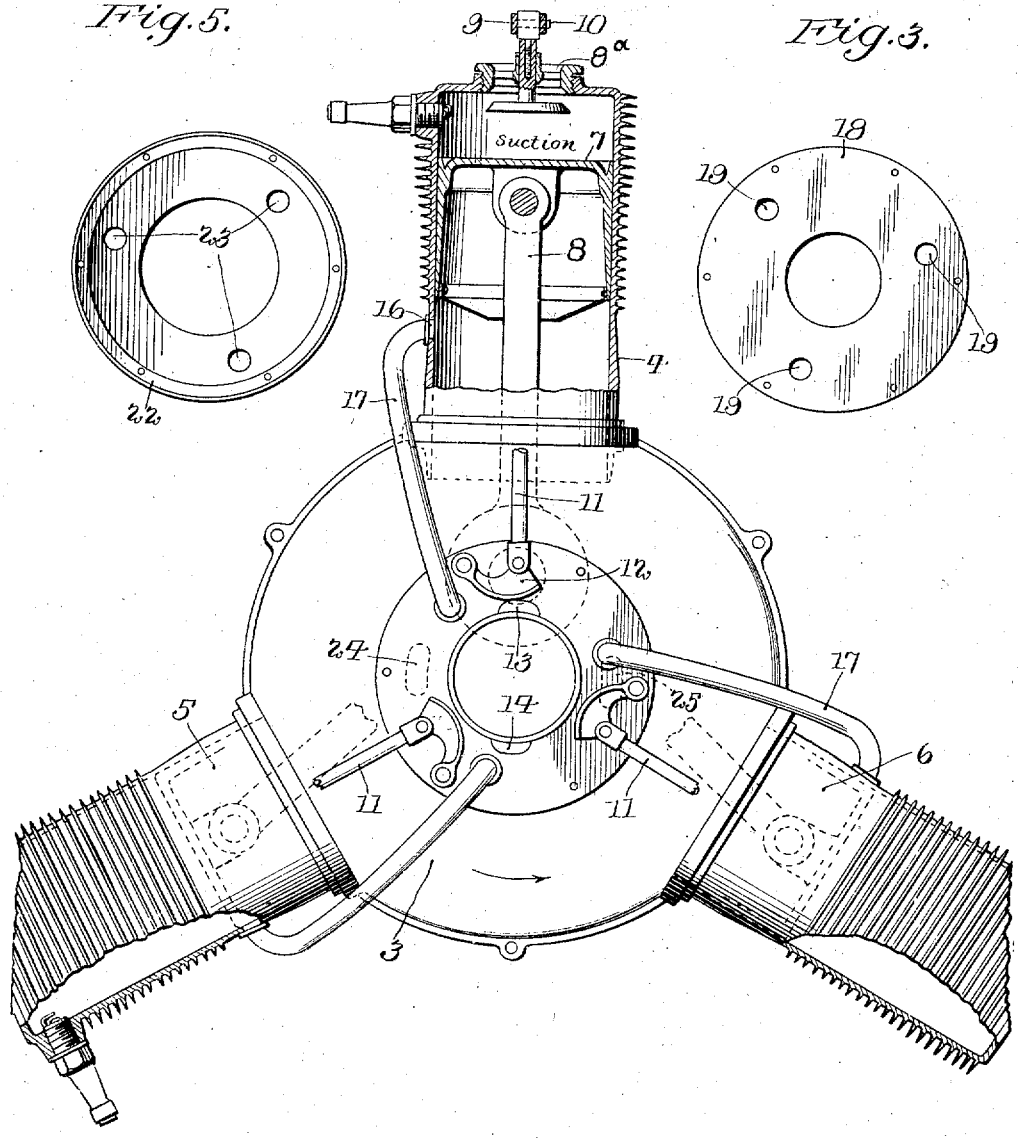

In the drawings, which show by way of illustration, one embodiment of the invention, Figure 1 is a view partly in section and partly in side elevation showing an engine having my improvements applied thereto, Fig. 2 is a similar view showing an end view of the engine casing, parts being broken away to show the interior of the cylinders. Fig. 3 is a detail in plan of the cap plate. Fig. 4 is a detail in plan of the controlling disk or cover for the intake ports, also showing the cam for operating the exhaust valves. Fig. 5 is a detail showing a rear view of the cover plate for the controlling disk.

The invention consists, generally, in providing a rotating casing on which is mounted a plurality of cylinders. This casing is mounted to rotate about a fixed supporting shaft which carries a crank to which the piston rods for the respective cylinders are attached. Each cylinder is provided with an intake port located adjacent the inner end of the stroke of the piston so that said intake port is uncovered by the piston. This intake port at the cylinder is entirely free of any valve or controlling devices. The intake port is supplied with fuel or combustion gases from a fuel chamber which according to the present embodiment of the invention is the crank casing. A rotating member operates to cover or close the passages leading from the intake ports to the crank casing except during the period of intake for the respective cylinders. In other words, the passage leading from each cylinder to the crank casing is uncovered so that it is entirely free from obstruction of any character just prior to the time when the piston uncovers the port of that particular cylinder so that the fuel or combustion gases may be drawn quickly into the cylinder by reason of the vacuum created in the cylinder during the instroke of the piston.

Referring more in detail to the drawings, in Fig. 1 I have shown a fixed shaft 1 on which is mounted a rotating sleeve 2 carrying a crank casing 3. The shaft 1 is provided with a crank $4^a$. The crank as herein shown, carries three cylinders 4, 5 and 6. In each cylinder there is a piston 7 to which is connected a piston rod 8. The piston rods in the various cylinders are connected to the crank $4^a$ and as the pistons move back and forth in the cylinders, said cylinders and the casing are caused to rotate about said crank. The crank casing and the connection with the cylinders forms a substantially closed chamber from which the fuel or combustion gases are fed to the engine cylinders.

Each cylinder is provided with an exhaust valve $8^a$ which operates to close the exhaust port in the outer end of the cylinder. This exhaust valve is preferably connected to a lever 9 which is fulcrumed at 10 to a bracket carried by the engine cylinder, and the lever 9 is in turn pivoted to a rod 11 connected at its other end to a shoe 12 adapted to engage cam projections 13 and 14 on the sleeve 15. This sleeve is rotatively mounted so as to turn independent of the crank casing and is operated by a suitable differential mechanism which turns the sleeve so as to bring about an opening and closing of the exhaust valve in proper timing for the usual four cycle engine.

Each cylinder is provided with an intake port 16. A pipe 17 leads from each intake port to the crank casing which forms as herein shown the fuel chamber. A cap plate 18 is fixed to the crank casing and is formed with three equally spaced openings 19. The crank casing is also provided with openings 20 registering with the openings 19. The sleeve 15 is formed with a disk 21 which rests against the cap plate 18. A cover plate 22 is fixed to the engine casing and said cover overlaps the disk 21 and is provided with three openings 23, which are arranged in line with the openings 19 and 20. The pipes 17 are fixed to the cover 22 so as to register with the openings 23. Except for the disk 21, which is located between the cover and the cap plate 18, there is a free unobstructed passage leading from the crank casing through the openings 20 and 19 and the pipes 17 to each cylinder. The disk 21 is formed with two elongated openings 24 and 25 which are diametrically opposite each other and which are located between the cams 13 and 14 which actuate the exhaust valves. These elongated openings 24 and 25 are caused to register at certain times and one after the other with certain of the openings 19 and 23. When either of these openings 24 or 25 are in register with the openings 19, 20 and 23, then there is a free passage from the crank casing through the pipe 17 to one of the cylinders. At this time the disk 21 operates as a gate or shutter for closing the passages leading from the crank casing to the other cylinders. This disk 21 is rotated at a differential speed relative to the rotation of the engine cylinder so that one of the openings therein will uncover the passage leading to the cylinder ready for taking a new supply of fuel or combustion gases just prior to the uncovering of said intake passage by the downward stroke of the piston so that when the piston uncovers the intake passage there will be a free unobstructed passage for the inrushing of the fuel of the combustion gases. At this time the passages leading to the other cylinders are closed or cut off by the disk 21.

The operation of my improved engine is as follows starting with the cylinders in the position shown in Fig. 2 and considering the engine as rotating in the direction of the arrow. The cylinder 4 has just completed the exhaust and the exhaust valve is still open by reason of the fact that the cam is still in engagement with the shoe 12 which opens the exhaust valve. During the first part of the inward stroke of the piston air is drawn into the cylinder after which the cam 13 passes from underneath the shoe 12 as the engine casing is rotating at a greater speed than the sleeve carrying the cam 13.

As the cylinders are rotating they are constantly moving away from the burnt gases which are expelled through the exhaust port. As the exhaust valve is held open during a part of the inward stroke of the piston fresh air surrounding the exhaust port will be drawn into the cylinder. Furthermore, where the exhaust port is held open during a part of the inward stroke of the piston there is very much less resistance to overcome in the reciprocation of the piston than in the type of engine where the exhaust valve is closed and the piston is creating a vacuum during its entire inward stroke.

It is well known that in a rotary cylinder engine centrifugal force aids in the carrying of the fuel outward into the cylinder and very little suction is necessary to carry sufficient fuel into the cylinder for the charge. I am, therefore, able to hold the exhaust valve open during a part of the inward stroke of the piston and still supply sufficient fuel to the cylinders when the intake ports are open.

In a three cylinder engine, such as shown in the drawings, the engine casing will rotate three times for every two revolutions of the cam sleeve 13. As soon as the exhaust valve closes a further inward movement of the piston will create a vacuum in the cylinder. The pipe 17 is carried by the engine casing and the openings in the cover plate and cap are gradually overcoming the elongated openings 24 in the shutter or disk and when the cylinder 4 reaches the position where the piston uncovers the intake port 16, said elongated opening 24 is brought into register with the openings 23, 20 and 19. This provides a free unobstructed passage between the engine casing and the cylinder so that as soon as the piston uncovers said intake port the fuel or combustion gases will be drawn with force into the cylinder by the vacuum created therein. The elongated opening 24 remains in register with said openings preferably until after the piston begins its outward stroke for compression. The cylinder 5 has just been fired and the piston is practically at the end of the expansion stroke. When the piston uncovers the intake port of this cylinder, the shutter is in such position as to close the passage between the pipe connected with said cylinder and the engine casing. This prevents any chance of a spark or of the heated gases passing from the cylinder into the engine casing and causing back firing.

By my construction as above described, the elongated openings 24 have a fixed relation to the operating cams for the exhaust valves and are, therefore, always maintained in proper timed relation to the operation of the exhaust valves. I may, if desired, mount the shutter so that it may be shifted relative to its actuating sleeve so as to partly close the passage leading from the intake port for throttling the engine and for reducing speed.

While I have shown my improved intake control as applied to three cylinder engines, it will be understood that the same may be used in connection with the multiple cylinder engine having any desired number of cylinders.

It will be understood that minor changes in the details of construction and arrangement of parts may be made without departing from the spirit of the invention as set forth in the appended claims.

Having thus described my invention, what I claim is:

1. A rotary gas engine including a plurality of cylinders, a piston for each cylinder, an intake port for each cylinder adapted to be uncovered by the piston during the intake period, means forming a passage connecting the intake port of each cylinder with a supply chamber, a rotating member for closing the passages leading to the intake ports, said rotating member having means for uncovering one of said passages at a time, and means for rotating said member in the same direction as the cylinders and at a differential speed relative thereto, whereby said intake passages are uncovered substantially during the period of intake for the respective cylinder.

2. A rotary engine including a plurality of cylinders, a piston for each cylinder, an intake port for each cylinder adapted to be uncovered by the piston during the intake period, means forming a passage connecting the intake port of each cylinder with a supply chamber, a rotating member located adjacent the supply chamber and away from the cylinders for closing the passages leading to the intake ports, said rotating member having means for uncovering one of said passages at a time, and means for rotating said member in the same direction as the cylinders and at a differential speed relative thereto, whereby said intake passages are uncovered substantially during the period of intake for the respective cylinder.

3. A gas engine including in combination a rotary casing, a plurality of cylinders carried thereby, an intake port for each cylinder, means forming a passage connecting the intake port with the casing, a rotating member for closing the passages leading from the casing to the intake ports, said member having means for uncovering one of said passages at a time and substantiallv during the period of intake for the cylinders.

4. A gas engine including in combination a rotary casing, a plurality of cylinders carried thereby, an intake port for each cylinder adapted to be uncovered by the piston, a pipe leading from each intake port to the casing, a rotating disk for normally closing the passage from the casing to the pipes, said disk having elongated openings therein adapted to register in turn with the passages leading to the pipes, and means for giving said disk a differential movement relative to the cylinders whereby the passage leading to each cylinder will be uncovered at every other revolution of the casing and substantially during the intake period for the cylinder.

In testimony whereof, I affix my signature in the presence of two witnesses.

ROBERT S. MOORE.

Witnesses:
E. G. Mason,
B. B. Thompson.

Copies of this patent may be obtained for five cents each, by addressing the "Commissioner of Patents, Washington, D. C."